United States Patent
Urabe et al.

(10) Patent No.: US 11,966,312 B2
(45) Date of Patent: Apr. 23, 2024

(54) OPERATION LOGS VISUALIZATION DEVICE, OPERATION LOGS VISUALIZATION METHOD AND OPERATION LOGS VISUALIZATION PROGRAM

(71) Applicant: Nippon Telegraph and Telephone Corporation, Tokyo (JP)

(72) Inventors: Yuki Urabe, Musashino (JP); Kimio Tsuchikawa, Musashino (JP); Shiro Ogasawara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 229 days.

(21) Appl. No.: 17/613,125

(22) PCT Filed: May 23, 2019

(86) PCT No.: PCT/JP2019/020480
§ 371 (c)(1),
(2) Date: Nov. 22, 2021

(87) PCT Pub. No.: WO2020/235085
PCT Pub. Date: Nov. 26, 2020

(65) Prior Publication Data
US 2022/0206923 A1    Jun. 30, 2022

(51) Int. Cl.
*G06F 11/00*   (2006.01)
*G06F 11/07*   (2006.01)
(Continued)

(52) U.S. Cl.
CPC .......... *G06F 11/32* (2013.01); *G06F 11/0769* (2013.01); *G06F 11/0775* (2013.01); *G06F 11/3065* (2013.01)

(58) Field of Classification Search
CPC ............. G06F 11/0769; G06F 11/0775; G06F 11/3065; G06F 11/32
See application file for complete search history.

(56) References Cited

U.S. PATENT DOCUMENTS

| | | | | |
|---|---|---|---|---|
| 2008/0046218 A1* | 2/2008 | Dontcheva | ............... | G06F 11/32 702/182 |
| 2010/0229112 A1* | 9/2010 | Ergan | ................... | G06F 11/0769 715/764 |

(Continued)

FOREIGN PATENT DOCUMENTS

| | | |
|---|---|---|
| JP | 2010-079342 | 4/2010 |
| JP | 2015-005010 | 1/2015 |

(Continued)

OTHER PUBLICATIONS

[No Author Listed] [online], "D-Analyzer," Tenda Co., Ltd., dated 2018, retrieved on Apr. 3, 2019, retrieved from URL <https://www.tepss.com/danalyzer/>, 10 pages (no translation).

(Continued)

*Primary Examiner* — Joshua P Lottich
(74) *Attorney, Agent, or Firm* — Fish & Richardson P.C.

(57) ABSTRACT

An operation log visualization device includes processing circuitry configured to store operation logs each containing a captured image of an operation screen captured during an operation and information identifying a position of an operation location in an operation target window on the operation screen, generate images in each of which a portion corresponding to the position in the captured image is highlighted, and generate a flowchart by arranging the generated images in an order of processing of operation logs corresponding to the images.

6 Claims, 8 Drawing Sheets

(51) Int. Cl.
  *G06F 11/30*   (2006.01)
  *G06F 11/32*   (2006.01)

(56) References Cited

U.S. PATENT DOCUMENTS

2014/0375550 A1    12/2014   Unno
2019/0102167 A1*    4/2019   Unno .................... G06F 3/0484

FOREIGN PATENT DOCUMENTS

| JP | 2015-153210 | 8/2015 |
| JP | 2016-004379 | 1/2016 |

OTHER PUBLICATIONS

[No Author Listed] [online], "Document Object Model (DOM)," MDN, retrieved on Apr. 3, 2019, retrieved from URL <https://developer.mozilla.org/ja/docs/Web/API/Document_Object_Model>, 15 pages (with English translation).

[No Author Listed] [online], "UI Automation Overview," Microsoft Docs, dated Mar. 30, 2017, retrieved on Sep. 22, 2021, retrieved from URL <https://docs.microsoft.com/ja-jp/dotnet/framework/ui-automation/ui-automation-overview>, 9 pages (with English translation).

[No Author Listed] [online], "Windows API Index," Microsoft Docs, dated May 31, 2018, retrieved on Apr. 3, 2019, retrieved from URL <http://docs.microsoft.com/en-us/windows/desktop/apiindex/windows-api-list>, 11 pages.

* cited by examiner

| OPERATION TIME | OPERATION TARGET WINDOW | OPERATION LOCATION | POSITION | CAPTURED IMAGE |
|---|---|---|---|---|
| 2019/03/19 17:50:23 | MENU | Value | (30,30,50,10) | img_1.png |
| 2019/03/19 17:51:35 | MENU | Registration | (100,150,20,10) | img_2.png |
| 2019/03/19 17:52:48 | REGISTERED SCREEN | Close | (50,150,25,10) | img_3.png |

14a

OPERATION LOGS VISUALIZATION DEVICE, OPERATION LOGS VISUALIZATION METHOD AND OPERATION LOGS VISUALIZATION PROGRAM

CROSS-REFERENCE TO RELATED APPLICATIONS

This application is a National Stage application under 35 U.S.C. § 371 of International Application No. PCT/JP2019/020480, having an International Filing Date of May 23, 2019, the disclosure of which is considered part of the disclosure of this application, and is incorporated in its entirety into this application.

TECHNICAL FIELD

The present invention relates to an operation log visualization device, an operation log visualization method and an operation log visualization program.

BACKGROUND ART

In general, in work analysis for business improvement in an enterprise, it is important that a work analyst knows the actual states of work of interest. To know the actual states of work, techniques are known in which contents of operations performed on an information terminal by a worker are stored as an operation log (see Patent Literature 1) and, based on the operation log, an operation procedure is visualized in flowchart form (see Non-Patent Literature 1). For example, operation logs previously recorded are taken as inputs and a set of operation logs containing operations that can be considered identical is represented as one node by a geometric figure such as a rectangle, and such geometric figures are connected by edges represented by arrows, thereby displaying a sequence of operations.

In this regard, techniques for acquiring operation times, GUI components and their attributes, and a captured image from an operation screen of an information terminal have been disclosed (see Non-Patent Literatures 2 to 4).

CITATION LIST

Patent Literature

Patent Literature 1: Japanese Laid-open Patent Publication No. 2015-153210

Non-Patent Literature

Non-Patent Literature 1: "D-Analyzer", [online], 2018, Tenda Co., Ltd., [accessed on Apr. 3, 2019], Internet URL: https://www.tepss.com/danalyzer/>
Non-Patent Literature 2: "UI Automation Overview", [online], 2017, Microsoft Docs, [accessed on Apr. 3, 2019], Internet <URL: https://docs.microsoft.com/ja-jp/dotnet/framework/ui-automation/ui-automation-overview>
Non-Patent Literature 3: "Windows API Index", [online], 2018, Microsoft Docs, [accessed on Apr. 3, 2019], Internet <URL: http://docs.microsoft.com/en-us/windows/desktop/apiindex/windows-api-list>
Non-Patent Literature 4: "Document Object Model (DOM)", [online], MDN, [accessed on Apr. 3, 2019], Internet <URL:https://developer.mozilla.org/ja/docs/Web/API/Document_Object_Model>

SUMMARY OF THE INVENTION

Technical Problem

However, it is difficult in some cases for a work analyst to know actual work states of workers using the prior art techniques. For example, when operation logs acquired from an information terminal are directly visualized as a flowchart, it is difficult for a work analyst to know actual work states if the work analyst does not understand what kind of task or work that the information in each operation log indicates.

The present invention has been made in light of the foregoing and an object of the present invention is to allow a work analyst to readily know actual work states of workers.

Means for Solving the Problem

To solve the problem described above and achieve the object, an operation log visualization device according to the present invention includes processing circuitry configured to store operation logs each containing a captured image of an operation screen captured during an operation and information identifying the position of an operation location in an operation target window on the operation screen, generate images in each of which a portion corresponding to the position in the captured image is highlighted, and generate a flowchart by arranging the generated images in an order of processing of operation logs corresponding to the images.

Effects of the Invention

According to the present invention, a work analyst can readily know actual work states of workers.

DESCRIPTION OF EMBODIMENTS

Figure 1:
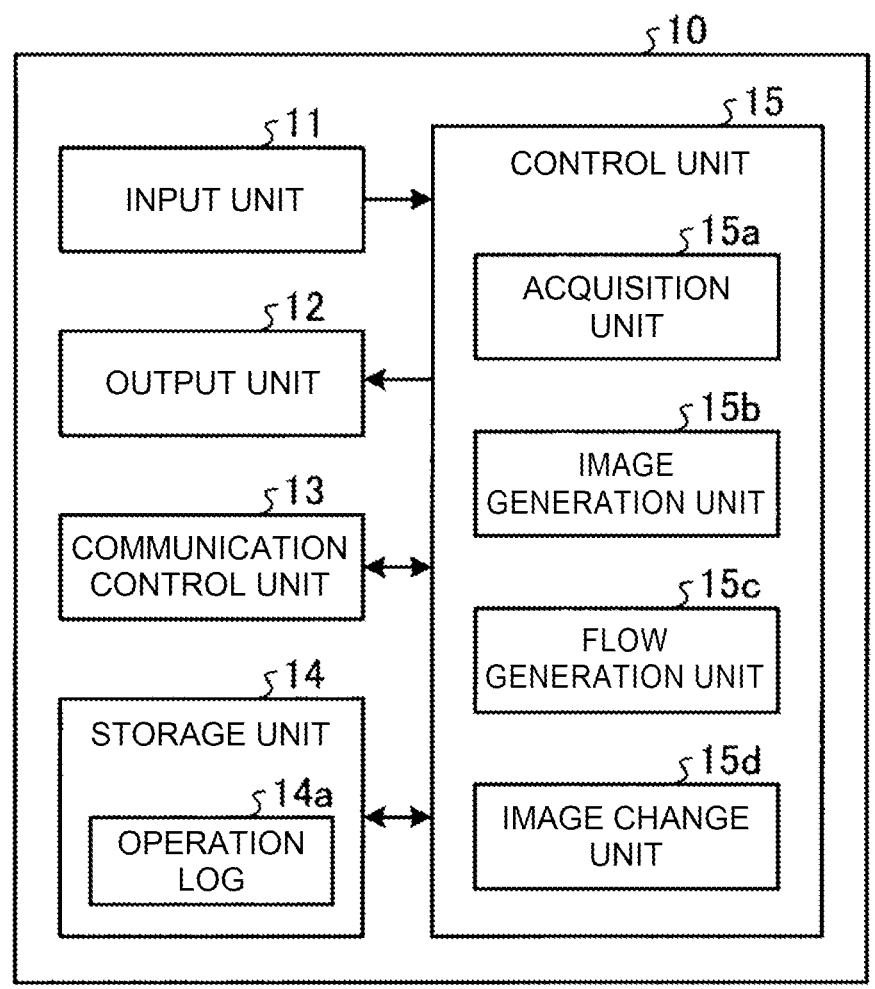
FIG. 1 is a schematic diagram illustrating a general configuration of an operation log visualization device according to a present embodiment.

One embodiment of the present invention will be described in detail with reference to the drawings. It should be noted that the present invention is not limited by the embodiment. Further, like reference signs are given to like elements illustrated in the drawings.

[Configuration of Operation Log Visualization Device]
FIG. 1 is a schematic diagram illustrating a general configuration of an operation log visualization device according to the present embodiment. As illustrated in FIG. 1, the operation log visualization device 10 of the present embodiment is implemented by a general-purpose computer such as a personal computer and includes an input unit 11, an output unit 12, a communication control unit 13, a storage unit 14 and a control unit 15.

The input unit 11 is implemented using an input device, such as a keyboard and a mouse, through which various kinds of instruction information, such as an instruction to start a process, is input into the control unit 15 in response to an input operation by an operator. The control unit 15 of the present embodiment accepts inputs such as an input specifying an image to be changed through the input unit 11, for example, when a work analyst changes an image of a flowchart in a log visualization process described later.

The output unit 12 is implemented by a display device such as a liquid-crystal display and a printing device such as a printer. The control unit 15 of the present embodiment visualizes and displays, for example, a flowchart generated in the log visualization process, which will be described later, to a work analyst who is a user through the output unit 12.

The communication control unit 13 is implemented by an NIC (Network Interface Card) or the like and controls communication between an external device and the control unit 15 through an electrical communication line such as a LAN (Local Area Network) and the Internet. For example, the communication control unit 13 controls communication between an information terminal operated by a worker or a management device or the like for managing operation logs of the information terminal or the like and the control unit 15.

The storage unit 14 is implemented by a semiconductor memory element such as a RAM (Random Access Memory) or a Flash Memory, or a storage device such as a hard disk, an optical disc or the like. A processing program that causes the operation log visualization device 10 to operate and data used during execution of the processing program or the like are stored in the storage unit 14 previously or temporarily at every time processing is performed. It should be noted that the storage unit 14 may be configured to communicate with the control unit 15 through the communication control unit 13.

In the present embodiment, the storage unit 14 stores an operation log that contains a captured image of an operation screen captured during an operation and information identifying the position of an operation location in an operation target window on the operation screen. Specifically, the storage unit 14 stores an operation log 14a.

Figure 2:
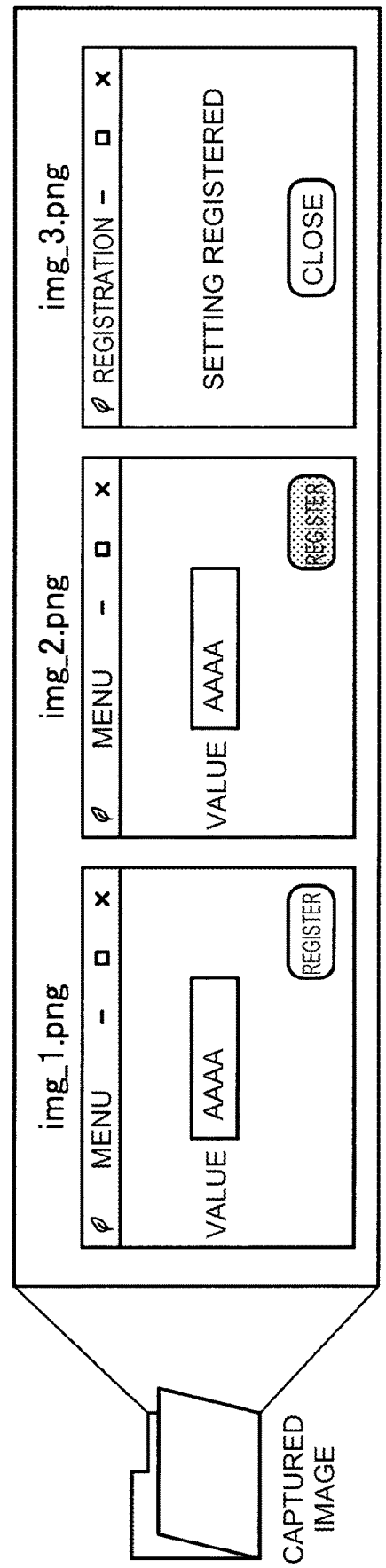
FIG. 2 is a diagram illustrating a data configuration of an operation log.

FIG. 2 is a diagram illustrating a data configuration of the operation log 14a. The operation log 14a contains a processing time and the content of processing. Specifically, the operation log 14a is an operation log at the time when a worker operated an information terminal, for example, and contains an operation time, a window title, an operation location, a position, a captured image and the like, as shown in FIG. 2.

An operation time here is a time at which operation was performed by an operator and means a processing time of an operation log. An operation target window is information that identifies a window operated, such as a title. An operation location is information that identifies an operation target location within a window, such as an input field name. A position is information, such as coordinates, that identifies the position of an operation location on an operation target window. A captured image is image data taken by capturing an operation screen displaying an operation target window.

FIG. 2 indicates that an operator (worker) performed an operation displayed on a captured image, "img_1.png", on an operation location, "Value", in a position, (30, 30, 50, 10), on a window having a title, "Menu", at an operation time, "17:50:23 on Mar. 19, 2019".

Further, the captured image "img_1.png" in FIG. 2 displays an operation for inputting a text, "aaaa". Further, a captured image, "img_2.png", displays an operation for pressing a register button.

In the present embodiment, the operation log 14a is acquired previously from an information terminal operated by a worker or a management device for managing operation logs acquired by an information terminal, and the like, prior to an operation log visualization process, which will be described later, and is stored in the storage unit 14. It should be noted that the information terminal may be implemented on the same hardware as the operation log visualization device 10.

Further, the operation log 14a is not limited to being stored in the storage unit 14 but may be collected when the operation log visualization process, which will be described later, is performed. In such a case, for example an acquisition unit 15a, which will be described later, may collect the operation log 14a prior to a process performed by an image generation unit 15b. Each record in the operation log 14a will be referred to as an operation log in the following description.

Figure 3:
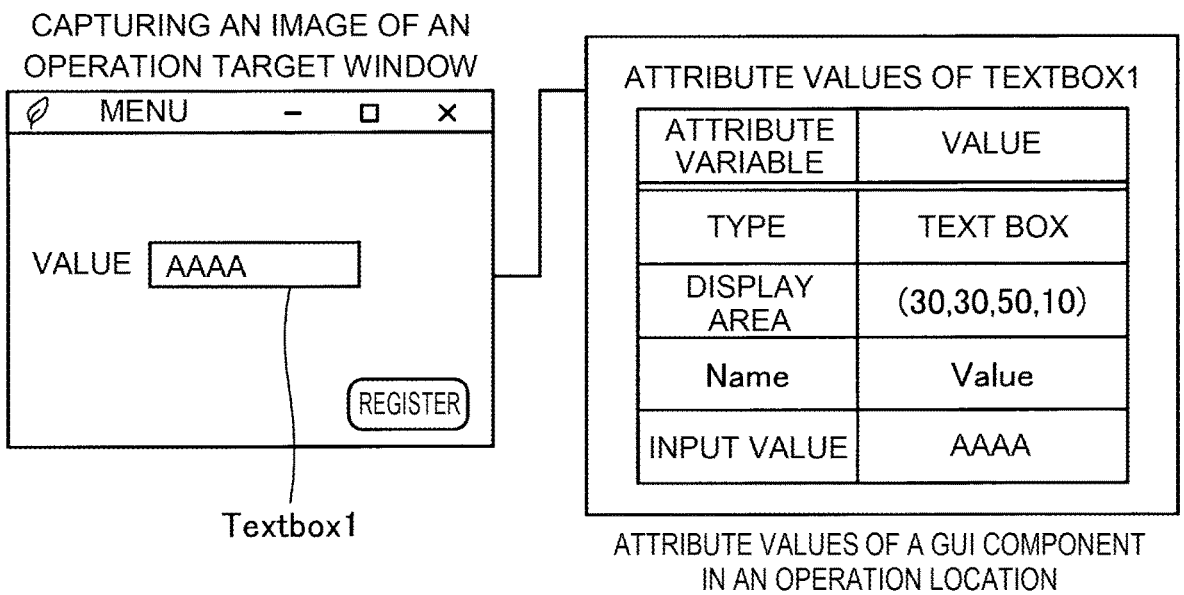
FIG. 3 is a diagram for explaining an operation log.

Here, FIG. 3 is a diagram for explaining an operation log. In an information terminal, an operation log is acquired at the time of the completion of an operation by a worker. For example, the information terminal acquires an operation log by considering the time of a change in a display state of a GUI component to be the time of the completion of a user operation (see Patent Literature 1). In other words, the information terminal holds, as a cache, attribute values of all GUI components in an operation screen before a user performed an operation, compares the attribute values with attribute values of all the GUI components in the operation screen after the completion of the operation by the user, and records a location with a different attribute value as an operation location.

In the example illustrated in FIG. 3, the operation log is acquired at the time of input of "aaaa" in a text box, "Textbox 1", in an operation target window, "Menu", with the operation location being the name of the Textbox 1, "Value". The acquired operation log contains an operation time, "17:50:23, Mar. 19, 2019", an operation target window, "Menu", an operation location, "Value", a position, (30, 30, 50, 10) and a captured image of the operation screen.

The operation time here is acquired from the Windows (registered trademark) API (see Non-Patent Literature 3). The operation target window is identified by a window title acquired from the Windows API or a URL acquired from a browser such as Firefox, Internet Explorer, Chrome, or the like.

The captured image of the operation screen of the operation target window is acquired from the Windows API.

Further, the operation location is identified by information that varies from GUI component to GUI component in an operation screen. For example, information that identifies an operation location is acquired using UI Automation (see Non-Patent Literature 2). Alternatively, information that identifies an operation location may be an identifier or name attribute of a DOM object of a browser (see Non-Patent Literature 4).

Further, the position of an operation location is identified by a display area of a GUI component in the operation location acquired in UI Automation or the coordinates of a mouse click acquired in the Windows API, or the like. The position of the operation location may be identified by the display area of a GUI component in the operation location acquired in a browser.

Returning to the description of FIG. 1, the control unit 15 is implemented using a CPU (Central Processing Unit) or the like and executes a processing program stored in a memory. This causes the control unit 15 to function as the acquisition unit 15a, the image generation unit 15b, a flow generation unit 15c and an image change unit 15d as illustrated in FIG. 1. It should be noted that these functional units may be implemented individually in different pieces of hardware or some of the functional units may be implemented in different pieces of hardware. Further, the control unit 15 may include other functional units.

The acquisition unit 15a acquires an operation log through the input unit 11 or the communication control unit 13 prior to the operation log visualization process, which will be described later, and stores the operation log in the storage unit 14.

The image generation unit 15b generates an image in which a portion corresponding to the position of an operation location in a captured image is highlighted. Specifically, the image generation unit 15b maps the position of an operation location contained in an operation log to the captured image and generates an image in which the position is highlighted with a bold or red box or the like that encloses the position. The position of the operation location is identified by, for example, the display area of a GUI component in the operation location or the position of a mouse click in the operation location, as described above.

Figure 4:
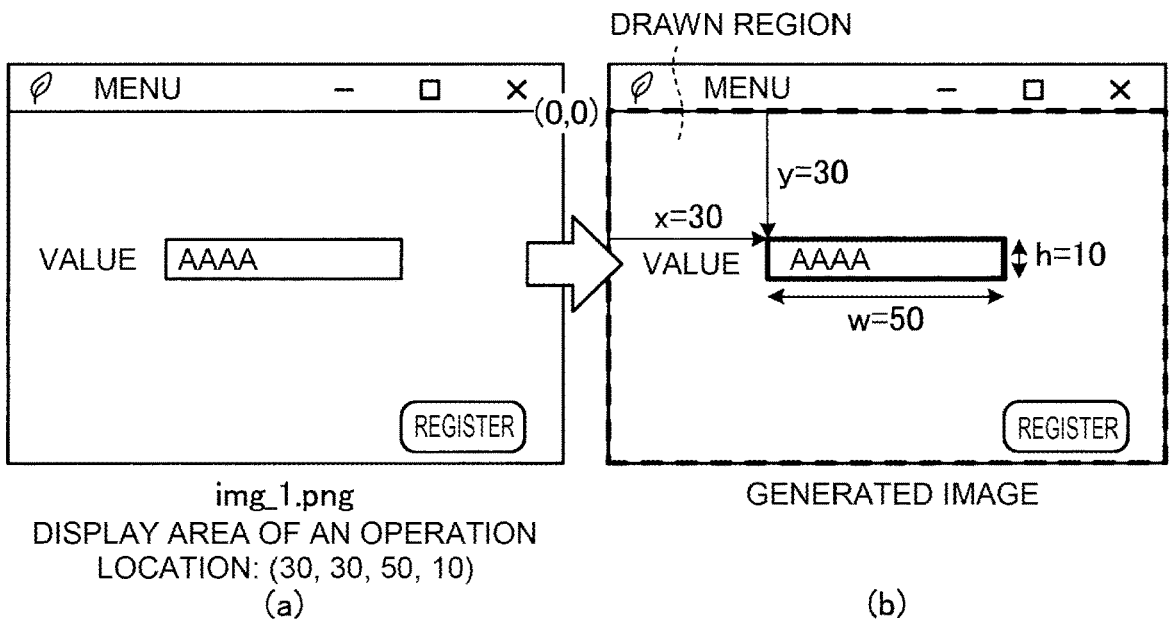
FIG. 4 is a diagram for explaining a process performed by an image generation unit.
Figure 5:
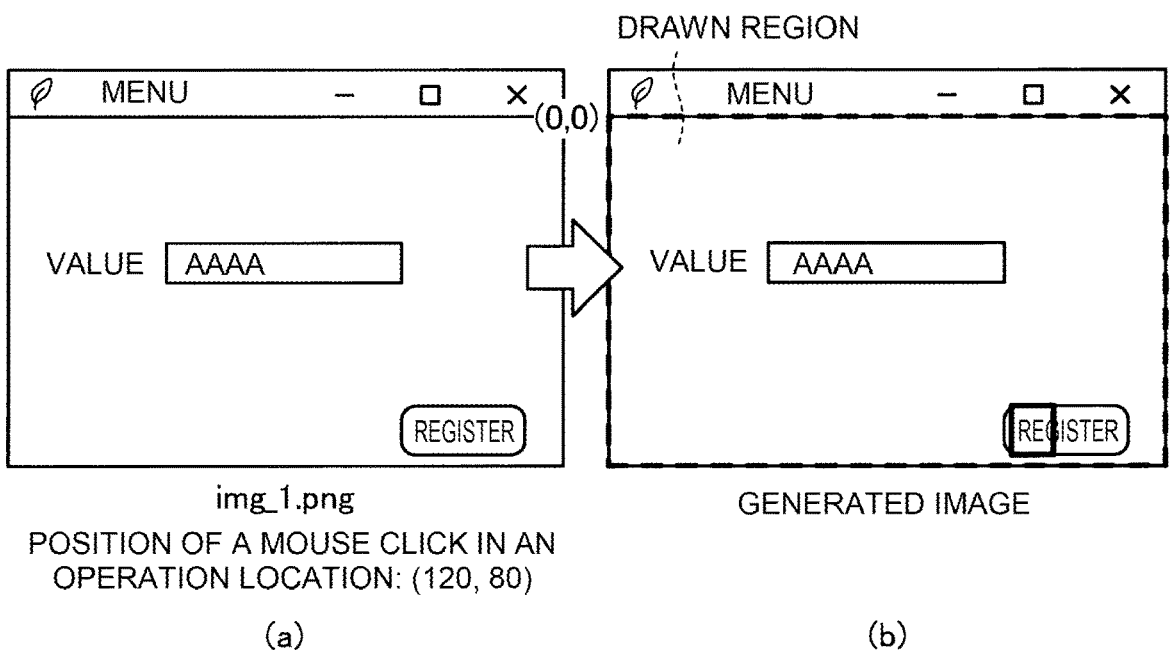
FIG. 5 is a diagram for explaining a process performed by the image generation unit.

FIGS. 4 and 5 are diagrams for explaining a process performed by the image generation unit 15b. First, a case where the position of an operation location has been identified by a display area of a GUI component in the operation location is illustrated in FIG. 4. In the example illustrated in FIG. 4, the position of an operation location in an operation log is identified by a display area, (x, y, w, h)=(30, 30, 50, 10), of the operation location, "Value". The display area here is represented by the coordinates (x, y) of the upper left corner of the display area and the width W and height H of the display area in a drawn region of a window indicated by enclosing in a dashed box in FIG. 4(b). The coordinates (x, y) in this case are values with respect to the coordinates (0, 0) of the upper left corner of the drawn region of the window.

In this case, the image generation unit 15b generates an image in which a portion corresponding to the display area of the operation location in the captured image img_1.png is highlighted with a bold box enclosing the portion, as illustrated in FIG. 4(b).

Further, FIG. 5 illustrates a case where the position of an operation location is identified by the position of a mouse click in the operation location. In the example illustrated in FIG. 5, the position of the operation location in the operation log is identified by the position of a mouse click on the operation location, "Register", (x, y)=(120, 80). Here, the position of the mouse click is represented by coordinates (x, y) with respect to the upper left corner of the drawn region of the window, (0, 0), as in the case illustrated in FIG. 4.

In this case, again the image generation unit 15b generates an image in which the portion corresponding to the position of the mouse click in the operation location in the captured image img_1.png is highlighted with a bold box enclosing the portion, as illustrated in FIG. 5(b). It should be noted that the highlighted portion is a region the upper left corner of which is at the mouse click position and has a width and a height that are arbitrarily set.

Returning to the description of FIG. 1, the flow generation unit 15c generates a flowchart by arranging generated images in the order of processing of operation logs corresponding to the images. Specifically, the flow generation unit 15c arranges images generated by the image generation unit 15b in the order of processing of the corresponding operation logs and processes the operation logs so that they can be visualized and displayed on the output unit 12 as a flowchart. Further, the flow generation unit 15c visualizes the flowchart based on the processed operation logs and outputs the resulting flowchart to the output unit 12.

Arranging images in the order of processing of operation logs herein means that images generated corresponding to operation logs are arranged in chronological order of records (operation logs) in the operation log 14a. Further, if an operation log is acquired for each series of processes identified by identification information such as an order ID, images generated corresponding to operation logs are arranged in chronological order of the operation logs for each series of processes. For example, when a plurality of operation logs corresponding to different order IDs have been acquired, the flow generation unit 15c generates a flowchart for each order ID. This enables the operation log visualization device 10 to overlay and visualize flowcharts having different order IDs on top of one another.

Then, the flow generation unit 15c sets edges that connect nodes which are the images corresponding to the operation logs. Further, the flow generation unit 15c adds a "start" node at the beginning of a series of operation logs and adds an "end" node at the end of the series of the operation logs. In this way, the flow generation unit 15c generates a flowchart.

In doing this, the flow generation unit 15c generates the flowchart by considering operation logs, among a plurality of operation logs, that show the same operation location in an operation target window and different operation times to be identical. In other words, the flow generation unit 15c considers operations that input different text characters at different operation times to be identical and treats the operations as the same node, as long as the operations are performed in the same operation location in an operation target window. Therefore, the flow generation unit 15c can generate a more rationalized flowchart.

Figure 6:
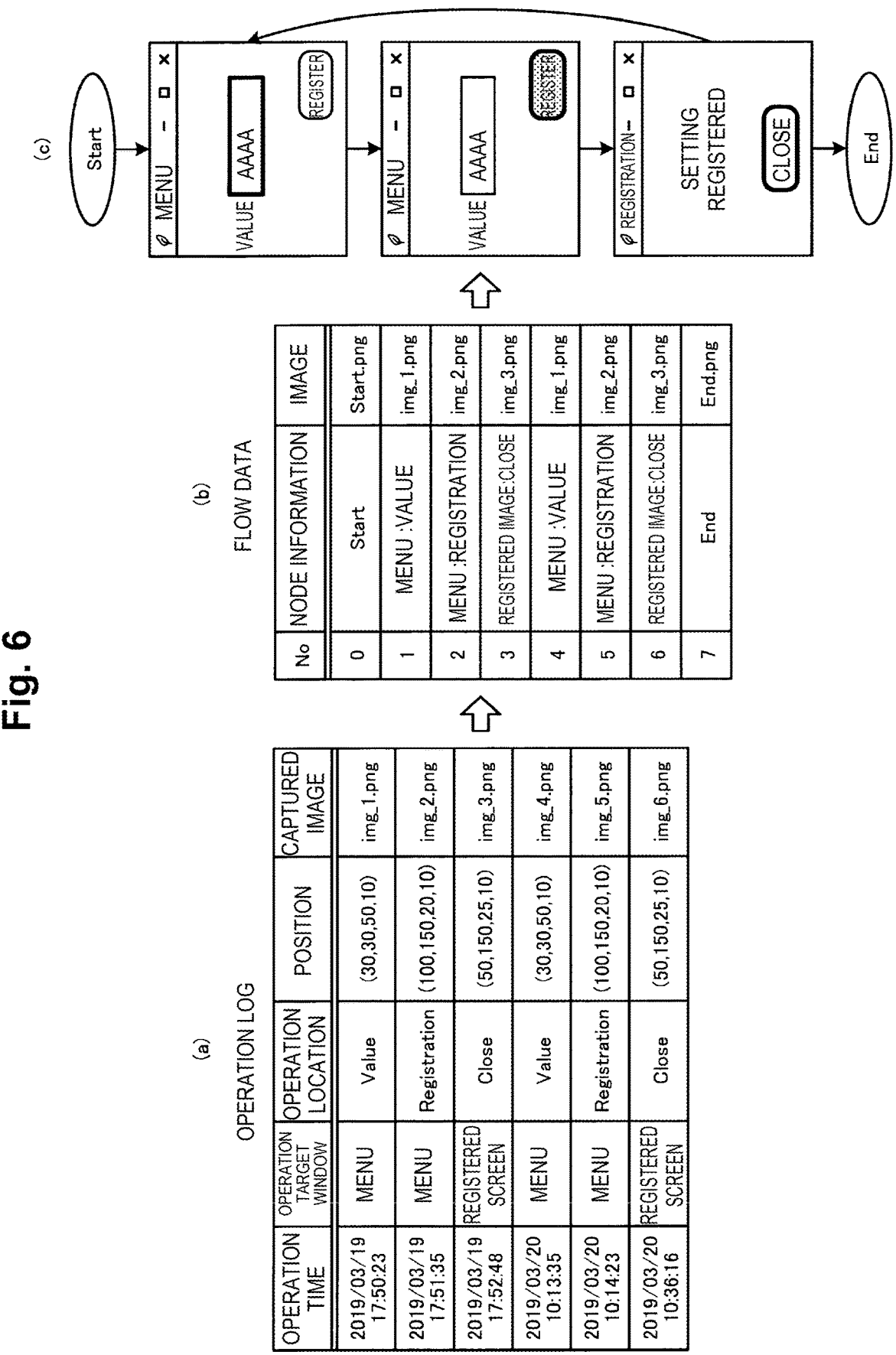
FIG. 6 is a diagram for explaining a process performed by a flow generation unit.

FIG. 6 is a diagram for explaining a process performed by the flow generation unit 15c. The flow generation unit 15c considers operation logs, in a series of operation logs indicating different operation times illustrated in FIG. 6(a), that show the same operation target window and the same operation location to be identical. Specifically, the flow generation unit 15c determines operation logs having the same text characters of information identifying an operation target window and the same text characters of information identifying an operation location to be identical operation logs and generates flow data for generating a flowchart, as illustrated in FIG. 6(b).

In doing this, the flow generation unit 15c unifies images corresponding to the operation logs considered identical into one of generated images. For example, the flow generation unit 15c selects an image generated for an operation log with the earliest operation time.

In the example illustrated in FIG. 6(b), node information of each operation log indicates an operation target window and an operation location. Further, a node with node information "Start" is added at the beginning of the series of operation logs and a node with node information "End" is added at the end. Numbers (No) are assigned to the operation logs in chronological order of operation.

Further, for example, the operation log with No "1" and the operation log with No "4" are determined to be identical operation logs with identical node information "Menu: Value" and their corresponding images are unified into "img_1.png".

Then, the flow generation unit 15c generates a flowchart based on the flow data, as illustrated in FIG. 6(c). In particular, the flow generation unit 15c generates a flowchart by connecting nodes which are images corresponding to the operation logs in the flow data by edges. In this regard, the operation log with No "4" is the same as the operation log with No "1" in the flow data illustrated in FIG. 6(b). The flow generation unit 15c therefore provides an edge that returns from the node corresponding to the operation log with No "3" to the node corresponding to the operation log with No "1", as illustrated in FIG. 6(c).

In this way, the flow generation unit 15c generates a flowchart represented by captured images of operation screens.

Returning to the description of FIG. 1, the image change unit 15d changes images in the generated flowchart to different images generated corresponding to operation logs considered identical. Specifically, the image change unit 15d changes an image to an image selected by the work analyst from among a plurality of images generated for a plurality of operation logs considered identical by the flow generation unit 15c.

Figure 7:
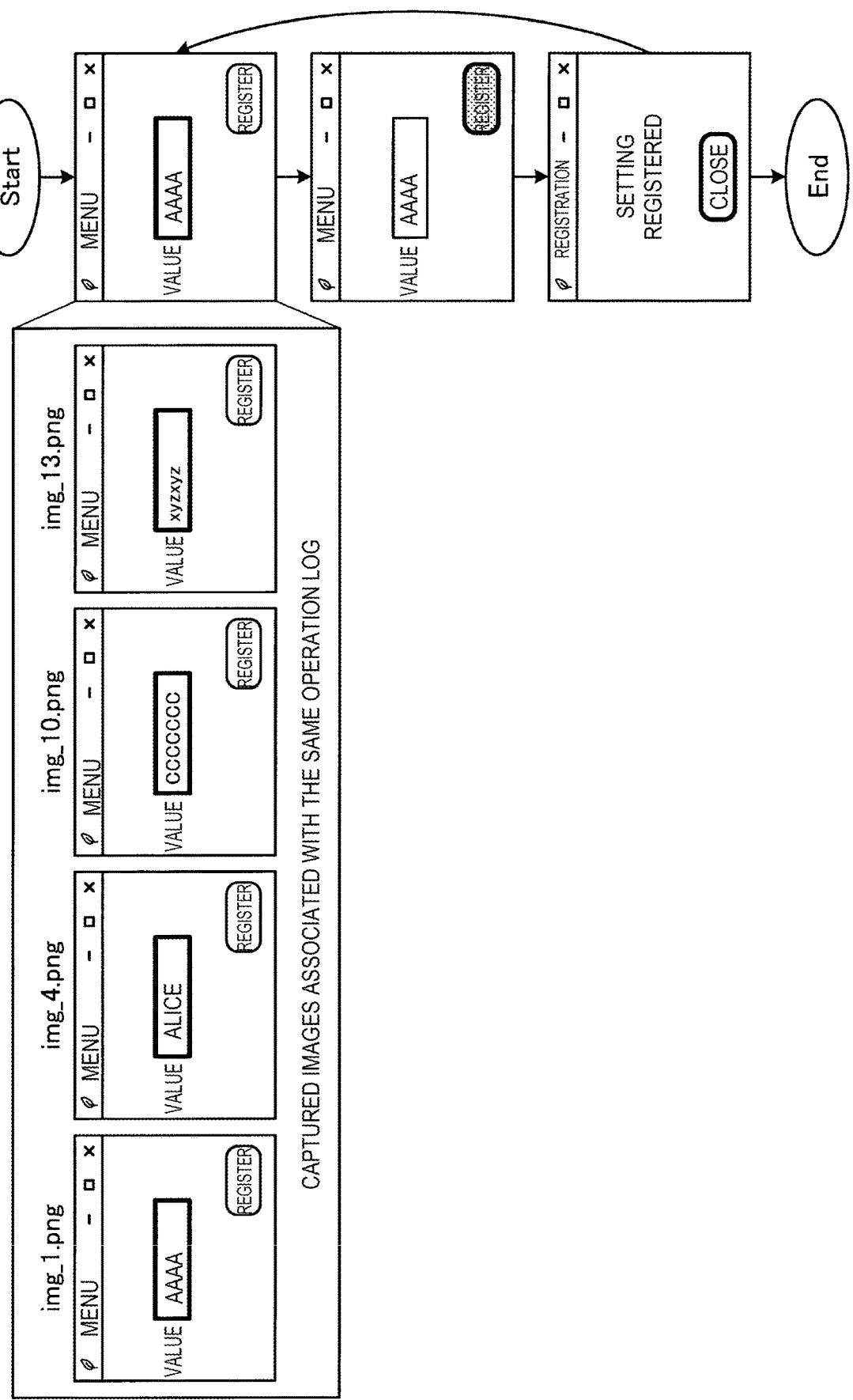
FIG. 7 is a diagram for explaining a process performed by an image change unit.

FIG. 7 is a diagram for explaining a process performed by the image change unit 15d. In FIG. 7, a case is illustrated where four images in which different text characters, "img_1.png", "img_4.png", "Img_10.png" and "img_13.png" are input are generated corresponding to operation logs with node information "Menu: Value".

Then, when the work analyst specifies a node with node information "Menu: Value" in the generated flowchart through the input unit 11, the image change unit 15d presents the four images given above to the work analyst through the output unit 12.

Further, the image change unit 15d accepts an input by the work analyst through the input unit 11 for selecting any of the images and changes the flow data so that the selected image is associated with a node. Further, the image change unit 15d visualizes and outputs the flowchart to the output unit 12 using the changed image. In this way, an image in the flowchart is changed to an easily comprehensible image selected by the work analyst.

[Operation Log Visualization Process]

Figure 8:
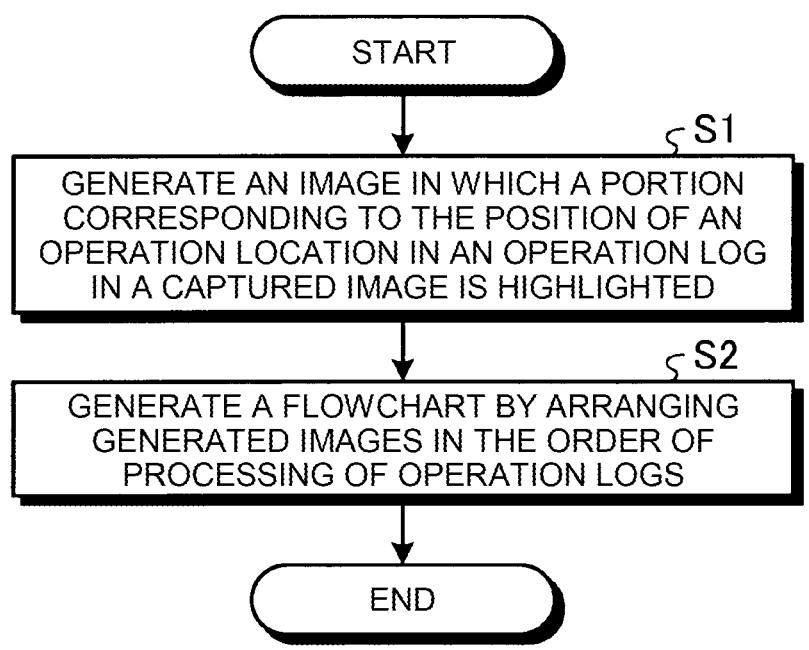
FIG. 8 is a flowchart illustrating an operation log visualization process procedure.

The operation log visualization process performed by the operation log visualization device 10 according to the present embodiment will be described next with reference to FIG. 8. FIG. 8 is a flowchart illustrating an operation log visualization process procedure. The flowchart of FIG. 8 is started, for example when a work analyst inputs an instruction to start the procedure.

First, the image generation unit 15b generates, for each of operation logs acquired by the acquisition unit 15a, an image in which a portion corresponding to the position of an operation location in a captured image is highlighted (step S1). In particular, the image generation unit 15b maps the position of an operation location contained in an operation log to a captured image and generates an image in which the position is highlighted with a bold or red box or the like that encloses the position.

Then, the flow generation unit 15c generates a flowchart by arranging the generated images in the order of processing of operation logs corresponding to the images (step S2). In particular, the flow generation unit 15c performs processing to arrange images generated by the image generation unit 15b in the order of processing of corresponding operation logs.

In doing this, the flow generation unit 15c generates the flowchart by considering operation logs, among a plurality of operation logs, that show the same operation location in an operation target window and different operation times to be identical.

The flow generation unit 15c then visualizes and displays the processed operation logs on the output unit 12 as a flowchart. With this, the operation log visualization process ends.

As described above, the storage unit 14 in the operation log visualization device 10 of the present embodiment stores operation logs each containing a captured image of an operation screen captured during an operation and information identifying the position of an operation location in an operation target window on the operation screen. The image generation unit 15b generates images in each of which a portion corresponding to the position of the operation location in a captured image is highlighted. The flow generation unit 15c generates a flowchart by arranging the generated images in the order of processing of operation logs corresponding to the images.

This allows a work analyst without knowledge about operation logs to readily understand the contents of operations in the operation logs of workers.

Conventionally, text labels indicating the content of operations are added to geometric figures, for example, representing nodes of a flowchart automatically or manually by a work analyst. It is not easy to manually add labels because the work analyst needs to know what kind of content of an operation would cause what kind of operation log to be output. In the case where labels are automatically added, it is not easy for a work analyst to understand the contents of operations from the added labels because the work analyst needs to know what kind of content of an operation would cause what kind of operation log to be output, or based on which kind of information in an operation log a label is generated. In either case, it is difficult to add an appropriate label from which a work analyst can understand operation contents.

In contrast, the operation log visualization device 10 according to the present embodiment allows a work analyst without knowledge about operation logs to readily understand operation contents, without labels representing the contents of operations added to the operation logs.

[Program]

A program that describes the processes performed by the operation log visualization device 10 according to the present embodiment can be written in a computer-executable language. In one embodiment, the operation log visualization device 10 can be implemented by causing an operation log visualization program that performs the operation log visualization process as packaged software or online software to be installed into a desired computer. For example, by causing an information processing device to execute the operation log visualization program described above, the information processing device can be caused to function as the operation log visualization device 10. Information processing devices as referred to herein include a desktop or notebook personal computer. Other information processing devices that fall in this category include mobile communication terminals such as a smartphone, a mobile phone, a PHS (Personal Handyphone System), and slate terminals such as a PDA (Personal Digital Assistant). Further, functions of the operation log visualization device 10 may be implemented on a cloud server.

Figure 9:
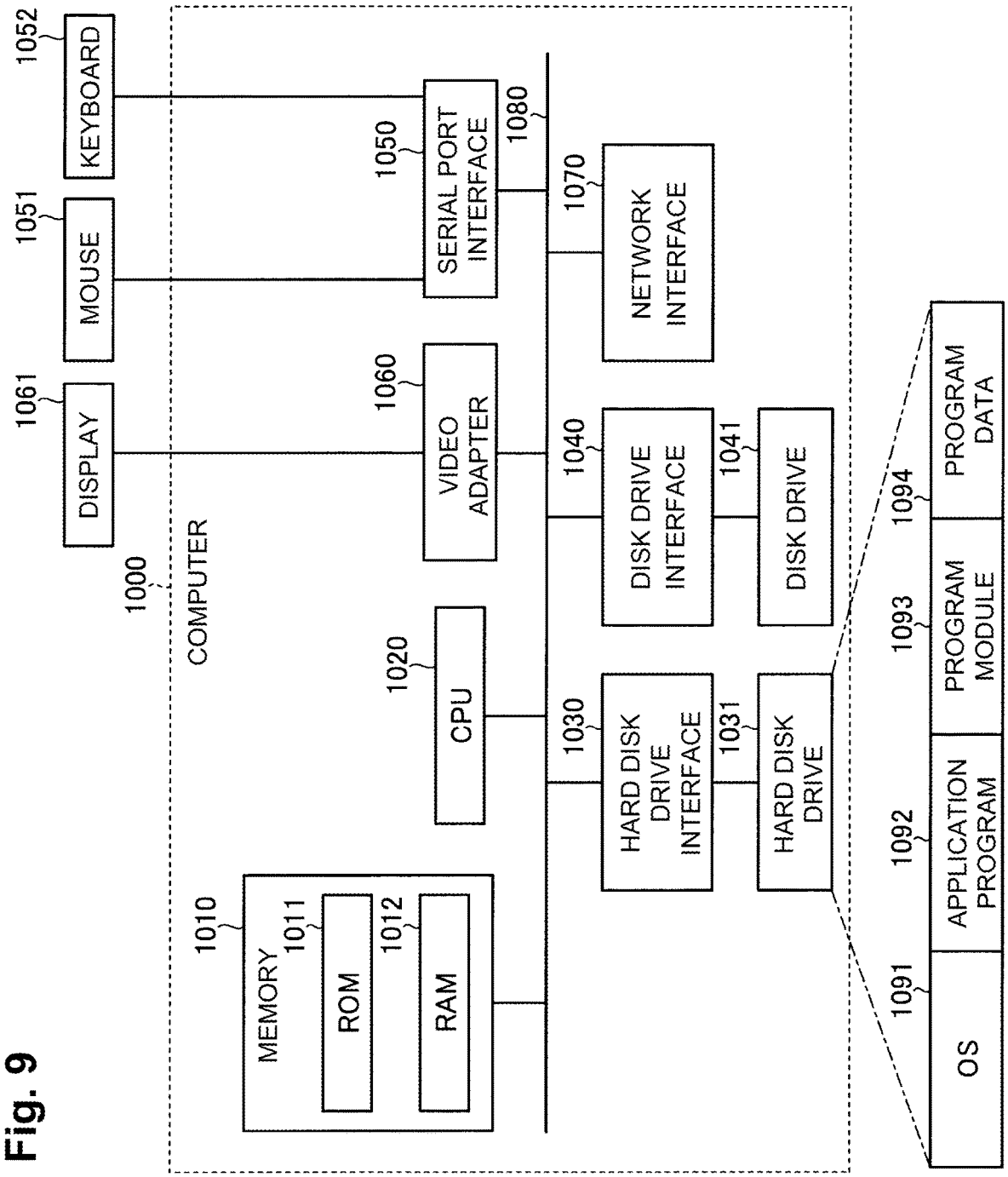
FIG. 9 is a diagram illustrating an example of a computer executing an operation log visualization program.

FIG. 9 is a diagram illustrating an example of a computer that executes the operation log visualization program. A computer 1000 includes, for example, a memory 1010, a CPU 1020, a hard disk drive interface 1030, a disk drive interface 1040, a serial port interface 1050, a video adapter 1060, and a network interface 1070. These components are interconnected through a bus 1080.

The memory 1010 includes a ROM (Read Only Memory) 1011 and a RAM 1012. The ROM 1011 stores a boot program such as BIOS (Basic Input Output System). The hard disk drive interface 1030 is connected to a hard disk drive 1031. The disk drive interface 1040 is connected to a disk drive 1041. A removable storage medium such as a magnetic disk or an optical disc, for example, is loaded into the disk drive 1041. A mouse 1051 and a keyboard 1052, for example, are connected to the serial port interface 1050. A display 1061, for example, is connected to the video adapter 1060.

The hard disk drive 1031 herein stores, for example, an OS 1091, an application program 1092, a program module 1093, and program data 1094. The items of information described with respect to the embodiment described above are stored in the hard disk drive 1031 and the memory 1010, for example.

Further, the operation log visualization program is stored in the hard disk drive 1031 as the program module 1093 in which instructions to be executed by the computer 1000, for example, are written. Specifically, the program module 1093 in which processes to be executed by the operation log visualization device 10 described with respect to the embodiment described above are written is stored in the hard disk drive 1031.

Data used in information processing according to the operation log visualization program is stored, for example, in the hard disk drive 1031 as the program data 1094. The CPU 1020 reads out the program module 1093 and the program data 1094 stored in the hard disk drive 1031 into the RAM 1012 as needed and performs the procedures described above.

It should be noted that the program module 1093 and the program data 1094 related to the operation log visualization program are not limited to being stored in the hard disk drive 1031 but may be stored, for example, on a removable storage medium and may be read out by the CPU 1020 through the disk drive 1041 or the like. Alternatively, the program module 1093 and the program data 1094 related to the operation log visualization program may be stored on another computer connected through a network such as a LAN or WAN (Wide Area Network) and may be read out by the CPU 1020 through the network interface 1070.

While embodiments to which the invention made by the present inventor is applied has been described above, the present invention is not limited by the description and drawings that constitute part of the disclosure of the present invention according to the present embodiments. In other words, other embodiments, implementations, operation techniques and the like implemented by those skilled in the art are all included in the scope of the present invention.

REFERENCE SIGNS LIST

10 Operation log visualization device
11 Input unit
12 Output unit
13 Communication control unit
14 Storage unit
14*a* Operation log
15 Control unit
15*a* Acquisition unit
15*b* Image generation unit
15*c* Flow generation unit
15*d* Image change unit

The invention claimed is:

1. An operation log visualization device comprising:
processing circuitry configured to:
store operation logs, wherein each operation log includes (i) an operation time at which an operation was performed, (ii) a captured image of an operation screen captured during an operation, and (iii) information identifying a position of an operation location in an operation target window on the operation screen;
generate images in each of which a portion corresponding to the position in the captured image is highlighted;
arrange the generated images in order of the operation times of the generated images;
identify, from among the operation locations of the one or more operation windows, shared operation locations;
for each shared operation location, unify the arranged images into one image, wherein the unifying of the arranged images includes selecting one image from the arranged images each having a different operation time; and
generate, based on the arrangement of the unified images, a flowchart having nodes and edges connecting the nodes, wherein the nodes are the unified images.

2. The operation log visualization device according to claim 1, wherein the selected one image corresponds to a first operation log having earliest operation time among operations logs associated with the identified shared operation locations.

3. An operation log visualization method performed on an operation log visualization device, the operation log visualization device including a storage storing operation logs, wherein each operation log includes (i) an operation time at which an operation was performed, (ii) a captured image of an operation screen captured during an operation, and (iii) information identifying a position of an operation location in an operation target window on the operation screen, the operation log visualization method comprising:
generating images in each of which a portion corresponding to the position in the captured image is highlighted;
arranging the generated images in order of the operation times of the generated images;
identifying, from among the operation locations of the one or more operation windows, shared operation locations;
for each shared operation location, unifying the arranged images into one image, wherein the unifying of the arranged images includes selecting one image from the arranged images each having a different operation time; and
generating, based on the arrangement of the unified images, a flowchart having nodes and edges connecting the nodes, wherein the nodes are the unified images.

4. The operation log visualization method according to claim 3, wherein the selected one image corresponds to a first operation log having earliest operation time among operations logs associated with the identified shared operation locations.

5. A non-transitory computer-readable recording medium storing therein an operation log visualization program that causes a computer to execute a process comprising:
- referencing a storage that stores operation logs, wherein each operation log includes (i) an operation time at which an operation was performed, (ii) a captured image of an operation screen captured during an operation, and (iii) information identifying a position of an operation location in an operation target window on the operation screen, and generating images in each of which a portion corresponding to the position in the captured image is highlighted;
- arranging the generated images in order of the operation times of the generated images;
- identifying, from among the operation locations of the one or more operation windows, shared operation locations;
- for each shared operation location, unifying the arranged images into one image, wherein the unifying of the arranged images includes selecting one image from the arranged images each having a different operation time; and
- generating, based on the arrangement of the unified images, a flowchart having nodes and edges connecting the nodes, wherein the nodes are the unified images.

6. The non-transitory computer-readable recording medium according to claim 5, wherein the selected one image corresponds to a first operation log having earliest operation time among operations logs associated with the identified shared operation locations.

* * * * *